United States Patent
Yoon et al.

(10) Patent No.: US 10,128,540 B2
(45) Date of Patent: Nov. 13, 2018

(54) LITHIUM SECONDARY BATTERY

(71) Applicant: LG Chem, Ltd., Seoul (KR)

(72) Inventors: Yourim Yoon, Daejeon (KR); Jong Mo Jung, Daejeon (KR); Jonghyun Chae, Daejeon (KR); Chul Haeng Lee, Daejeon (KR); Geun Chang Chung, Daejeon (KR); Young Cheol Choi, Daejeon (KR); Young Geun Choi, Daejeon (KR); Seung Jae Yoon, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/581,925

(22) Filed: Apr. 28, 2017

(65) Prior Publication Data

US 2017/0237123 A1 Aug. 17, 2017

Related U.S. Application Data

(63) Continuation-in-part of application No. 14/429,694, filed as application No. PCT/KR2013/010672 on Nov. 22, 2013.

(30) Foreign Application Priority Data

Nov. 22, 2012 (KR) .................. 10-2012-0133282
Nov. 22, 2013 (KR) .................. 10-2013-0142718

(51) Int. Cl.
*H01M 10/0569* (2010.01)
*H01M 10/0525* (2010.01)
(Continued)

(52) U.S. Cl.
CPC ....... *H01M 10/0569* (2013.01); *H01M 4/366* (2013.01); *H01M 4/587* (2013.01);
(Continued)

(58) Field of Classification Search
CPC ...... H01M 4/583; H01M 4/625; H01M 4/133; H01M 4/1393; H01M 2300/0028; H01M 2300/0037; H01M 10/0569
See application file for complete search history.

(56) References Cited

U.S. PATENT DOCUMENTS 3,947,289 A    3/1976  Dey et al.
7,566,350 B2 *  7/2009  Bowden ............... H01M 6/164
                                                29/623.1
(Continued)

FOREIGN PATENT DOCUMENTS

EP    2485316 A1   8/2012
EP    2495795 A1   9/2012
(Continued)

OTHER PUBLICATIONS

International Search Report for Application No. PCT/KR2013/010672 dated Feb. 27, 2014.

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Disclosed is a lithium secondary battery including: (i) a cathode active material including a lithium metal phosphate according to Formula 1 below; (ii) an anode active material including amorphous carbon; and (iii) an electrolyte for lithium secondary batteries including a lithium salt and an ether based solvent, wherein propylene carbonate (PC) is included in an amount of 1 wt % to 60 wt % in the electrolyte for lithium secondary batteries, based on the total weight of the electrolyte, $$Li_{1+a}M(PO_{4-b})X_b \qquad (1)$$

(Continued)

wherein M is at least one selected from metals of Groups II to XII; X is at least one selected from F, S and N, $-0.5 \leq a \leq +0.5$, and $0 \leq b \leq 0.1$.

11 Claims, 2 Drawing Sheets

(51) Int. Cl.
  *H01M 4/36* (2006.01)
  *H01M 4/58* (2010.01)
  *H01M 4/583* (2010.01)
  *H01M 4/62* (2006.01)
  *H01M 4/587* (2010.01)
  *H01M 4/136* (2010.01)
  *H01M 10/0568* (2010.01)

(52) U.S. Cl.
  CPC ......... *H01M 4/5825* (2013.01); *H01M 4/625* (2013.01); *H01M 10/0525* (2013.01); *H01M 4/136* (2013.01); *H01M 10/0568* (2013.01); *H01M 2220/10* (2013.01); *H01M 2220/20* (2013.01); *H01M 2300/0028* (2013.01); *H01M 2300/0037* (2013.01)

(56) References Cited

U.S. PATENT DOCUMENTS

| | | |
|---|---|---|
| 7,988,879 B2 | 8/2011 | Park et al. |
| 8,153,306 B2 | 4/2012 | Kim et al. |
| 2005/0042520 A1* | 2/2005 | Roh ............... H01M 6/164 429/330 |
| 2005/0287442 A1 | 12/2005 | Kim et al. |
| 2006/0088766 A1 | 4/2006 | Kim et al. |
| 2008/0138713 A1 | 6/2008 | Roh et al. |
| 2008/0305401 A1 | 12/2008 | Smart et al. |
| 2009/0220858 A1* | 9/2009 | Cheng ............. C01G 23/002 429/220 |
| 2009/0220859 A1 | 9/2009 | Yoon et al. |
| 2009/0286155 A1 | 11/2009 | Takehara |
| 2009/0325072 A1 | 12/2009 | Maeda et al. |
| 2009/0325076 A1 | 12/2009 | Matsui et al. |
| 2010/0021815 A1* | 1/2010 | Oh ............... H01M 10/0564 429/207 |
| 2010/0028783 A1 | 2/2010 | Nah |
| 2010/0279168 A1 | 11/2010 | Lee et al. |
| 2010/0285373 A1* | 11/2010 | Horikawa ............. H01G 9/038 429/324 |
| 2011/0059371 A1* | 3/2011 | Kamada ................ H01M 4/587 429/332 |
| 2012/0009452 A1* | 1/2012 | Ueda ................. H01M 4/13 429/94 |
| 2012/0208092 A1 | 8/2012 | Ku et al. |
| 2012/0225346 A1 | 9/2012 | Hoshina et al. |
| 2012/0244425 A1 | 9/2012 | Tokuda |

FOREIGN PATENT DOCUMENTS

| | | | |
|---|---|---|---|
| JP | S50084838 | A | 7/1975 |
| JP | S53025829 | A | 3/1978 |
| JP | S57174870 | A | 10/1982 |
| JP | 2002117843 | A | 4/2002 |
| JP | 2004031244 | A | 1/2004 |
| JP | 2007242441 | A | 9/2007 |
| JP | 2007257862 | A | 10/2007 |
| JP | 2008-147153 | A | 6/2008 |
| JP | 2010218937 | A | 9/2010 |
| JP | 2011181427 | A | 9/2011 |
| KR | 20080017289 | A | 2/2008 |
| KR | 100863887 | B1 | 10/2008 |
| KR | 100987280 | B1 | 10/2010 |
| KR | 20110017145 | A | 2/2011 |
| KR | 20110117552 | A | 10/2011 |
| WO | WO2011027503 | * | 3/2011 |
| WO | 2011040307 | A1 | 4/2011 |
| WO | 2011092073 | A1 | 8/2011 |
| WO | WO2011092073 | * | 8/2011 |

* cited by examiner

[FIG. 1]
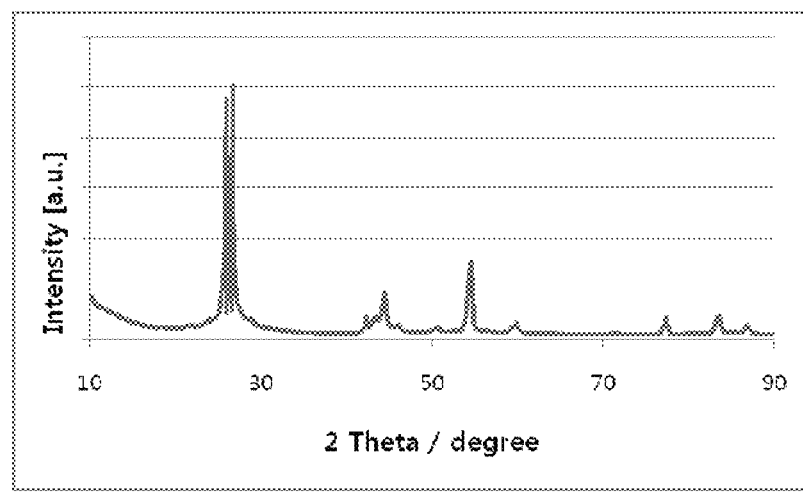
[FIG. 2]
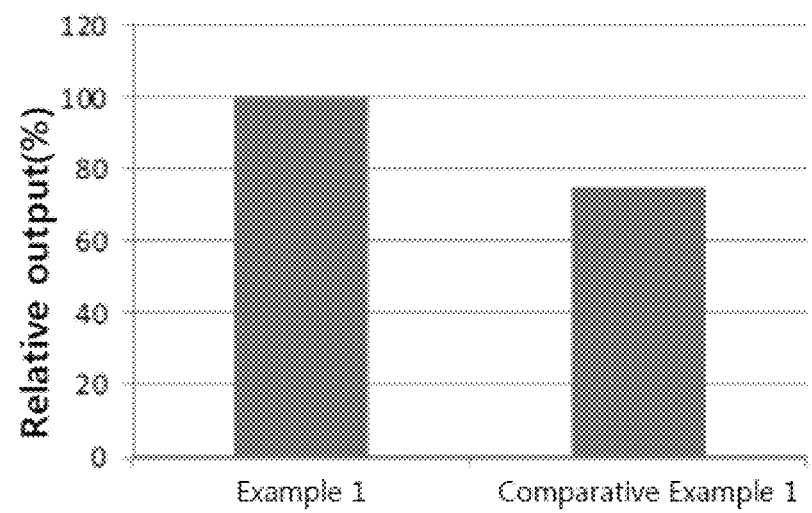

[FIG. 3]
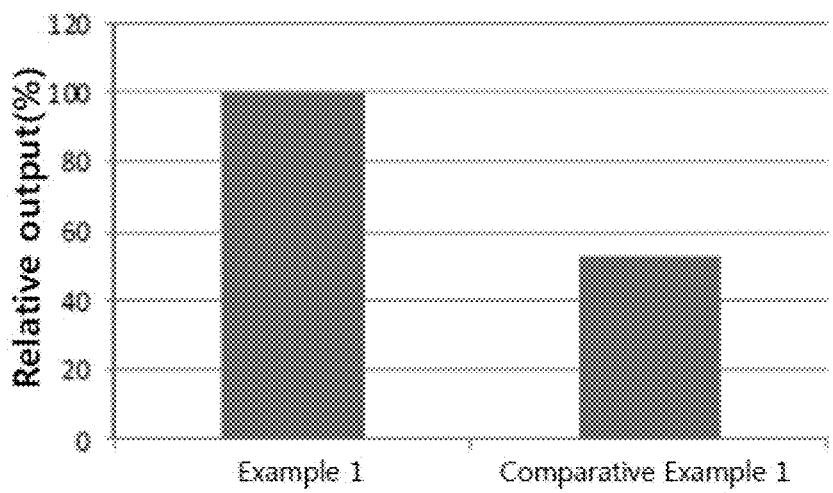
[FIG. 4]
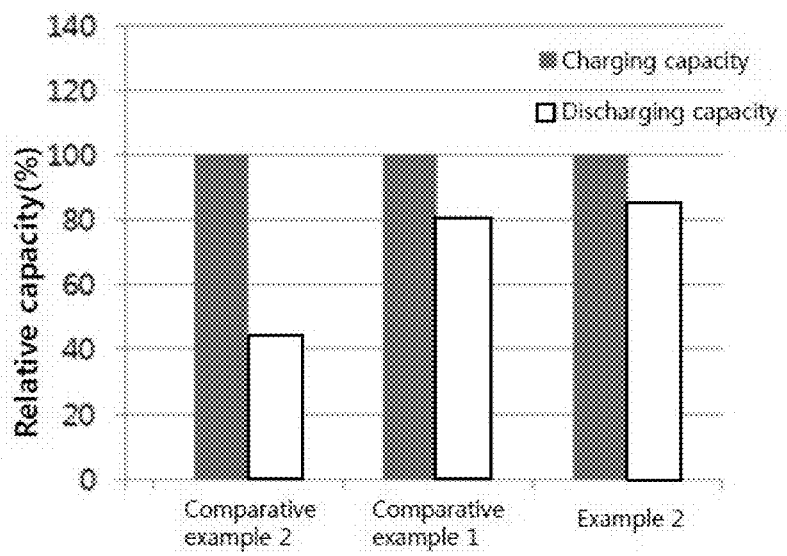

LITHIUM SECONDARY BATTERY

CROSS-REFERENCE TO RELATED APPLICATION

This application is a continuation-in-part of U.S. application Ser. No. 14/429,694, filed Mar. 19, 2015 which is a national phase of International Patent No. PCT/KR2013/010672, filed Nov. 22, 2013, which claims priority to Korean Patent Application No. 10-2013-0142718, filed Nov. 22, 2013 and Korean Patent Application No. 10-2012-0133282, filed Nov. 22, 2012, the disclosures of which are incorporated herein by reference.

TECHNICAL FIELD

The present invention relates to an electrolyte for lithium secondary batteries and a lithium secondary battery including the same. More particularly, the present invention relates to a lithium secondary battery including:
(i) a cathode active material including a lithium metal phosphate according to Formula 1 below:
(ii) an anode active material including amorphous carbon; and
(iii) an electrolyte for lithium secondary batteries including a lithium salt and an ether based solvent,
wherein propylene carbonate (PC) is included in an amount of 1 wt % to 60 wt % in the electrolyte for lithium secondary batteries, based on the total weight of the electrolyte,

$$Li_{1+a}M(PO_{4-b})X_b \tag{1}$$

wherein M is at least one selected from metals of Groups II to XII; X is at least one selected from F, S and N, $-0.5 \leq a \leq +0.5$, and $0 \leq b \leq 0.1$.

BACKGROUND ART

Demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized. Accordingly, research into secondary batteries, which may meet a variety of requirements, is being actively performed. In particular, there is high demand for lithium secondary batteries having high energy density, high discharge voltage, and output stability.

In particular, lithium secondary batteries used in hybrid electric vehicles must exhibit great output in short time and be used for 10 years or more under harsh conditions of repeated charge and discharge on a daily basis. Therefore, there are inevitable requirements for a lithium secondary battery exhibiting superior stability and output characteristics to existing small-sized lithium secondary batteries.

In connection with this, existing lithium secondary batteries generally use a lithium cobalt composite oxide having a layered structure, as a cathode and a graphite-based material as an anode. However, $LiCoO_2$ has advantages such as superior energy density and high-temperature characteristics while having disadvantages such as poor output characteristics. Due to such disadvantages, high output temporarily required at abrupt driving and rapid accelerating is provided from a battery and thus $LiCoO_2$ is not suitable for use in hybrid electric vehicles (HEVs) which require high output. In addition, due to characteristics of a method of preparing $LiNiO_2$, it is difficult to apply $LiNiO_2$ to actual production processes at reasonable cost. Furthermore, lithium manganese oxides such as $LiMnO_2$, $LiMn_2O_4$, and the like exhibit drawbacks such as poor cycle characteristics and the like.

Accordingly, a method of using a lithium transition metal phosphate as a cathode active material is under study. The lithium transition metal phosphate is broadly classified into $Li_xM_2(PO_4)_3$ having a NaSICON structure and $LiMPO_4$ having an olivine structure, and considered as a material having superior stability, when compared with existing $LiCoO_2$. At present, $Li_3V_2(PO_4)_3$ having a NaSICON structure is known and as compounds having an olivine structure, $LiFePO_4$ and $Li(Mn, Fe)PO_4$ are the most broadly researched. However, due to low electron conductivity of $LiFePO_4$, internal resistance of a battery increases when $LiFePO_4$ is used as a cathode active material and thus polarized potential increases when battery circuits are closed, thereby resulting in reduction of battery capacity.

Meanwhile, a carbon-based active material is mainly used as an anode active material. The carbon-based active material has a very low discharge potential of approximately −3 V, and exhibits extremely reversible charge/discharge behavior due to uniaxial orientation of a graphene layer, thereby exhibiting superior electrode cycle life. An electrode potential of the carbon-based active material is 0 V (Li/Li+) during charging of Li ions and thus may exhibit a potential similar to pure lithium metal. Accordingly, greater energy may be obtained when a cathode and a battery including a lithium transition metal oxide are formed.

Examples of the carbon-based active material include crystalline graphite such as natural graphite, synthetic graphite and the like, and amorphous carbon such as soft carbon, hard carbon and the like. The crystalline graphite has high energy density but relatively poor output characteristics, thereby being unsuitable for energy sources for hybrid electric vehicles (HEVs) requiring high output. In addition, when an ester based material is used as an electrolyte, there is a problem such as decomposition of an electrolyte.

Therefore, a lithium secondary battery meeting all of the characteristics such as high output, long cycle life and conservation lifespan, high stability, and the like is preferred as a second battery for hybrid electric vehicles (HEVs). However, such a lithium secondary battery is still under development.

DISCLOSURE

Technical Problem

The present invention aims to address the aforementioned problems of the related art and to achieve technical goals that have long been sought.

As a result of a variety of intensive studies and various experiments, the inventors of the present invention confirmed that, when a lithium secondary battery including a predetermined lithium metal phosphate as a cathode active material and amorphous carbon as an anode active material is used and a predetermined ether based solvent and propylene carbonate (PC) are used as an electrolyte for lithium secondary batteries, desired effects may be accomplished, thus completing the present invention.

Technical Solution

In accordance with one aspect of the present invention, provided is a lithium secondary battery including:

(i) a cathode active material including a lithium metal phosphate according to Formula 1 below;

(ii) an anode active material including amorphous carbon; and (iii) an electrolyte for lithium secondary batteries including a lithium salt and an ether based solvent, wherein, propylene carbonate (PC) is included in an amount of 1 wt % to 60 wt % in the electrolyte for lithium secondary batteries, based on the total weight of the electrolyte, $$Li_{1+a}M(PO_{4-b})X_b \quad (1)$$

wherein M is at least one selected from metals of Groups II to XII; X is at least one selected from F, S and N, $-0.5 \leq a \leq +0.5$, and $0 \leq b \leq 0.1$.

As described above, when the crystalline graphite and the non-aqueous ether-based solvent are used together, the electrolyte may be decomposed by crystalline carbon.

Accordingly, the anode active material including amorphous carbon is used in the lithium secondary battery according to the present invention and an electrolyte decomposition problem occurring when the crystalline graphite and the non-aqueous ether-based solvent are used together is thus resolved, thereby exhibiting superior room- and low-temperature output characteristics.

In addition, inventors of the present invention confirmed that, when the electrolyte, in which a predetermined ether based solvent and propylene carbonate (PC) are mixed, is used, a swelling phenomenon due to gas generation may be improved and high-temperature lifespan characteristics are thus improved.

In Particular, the propylene carbonate (PC) may be included in an amount of 1 wt % to 40 wt % based on the total weight of the electrolyte. When the amount of the propylene carbonate (PC) is extremely great, ionic conductivity of an electrolyte is undesirably reduced due to characteristics of carbonate having a great viscosity. On the other hand, when the amount of a carbonate based solvent is extremely small, desired effects are not undesirably exhibited.

The effects according to the present invention may be obtained by using particularly propylene carbonate among cyclic carbonates.

The ether based solvent, for example, may be at least one selected from the group consisting of tetrahydrofuran, 2-methyltetrahydrofuran, ethylene glycol dimethyl ether (1,2-dimethoxy ethane), and dibutyl ether, and may be particularly dibutyl ether.

The lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides. The concentration of the lithium salt may be 0.5 M to 3 M, particularly 0.8 M to 2 M, in the electrolyte.

The lithium metal phosphate may be a lithium iron phosphate having an olivine crystal structure of Formula 2 below:

$$Li_{1+a}Fe_{1-x}M'_x(PO_{4-b})X_b \quad (2)$$

wherein M' is at least one selected from Al, Mg, Ni, Co, Mn, Ti, Ga, Cu, V, Nb, Zr, Ce, In, Zn, and Y, X is at least one selected from F, S, and N, $-0.5 \leq a \leq +0.5$, $0 \leq x \leq 0.5$, and $0 \leq b \leq 0.1$.

When values of a, b and x are outside the above ranges, conductivity is reduced or it is impossible to maintain the olivine structure of the lithium iron phosphate. In addition, rate characteristics are deteriorated or capacity may be reduced.

More particularly, the lithium metal phosphate having the olivine crystal structure may be LiFePO$_4$, Li(Fe, Mn)PO$_4$, Li(Fe, Co)PO$_4$, Li(Fe, Ni)PO$_4$, or the like, more particularly LiFePO$_4$.

That is, the lithium secondary battery according to the present invention uses LiFePO$_4$ as a cathode active material and amorphous carbon as an anode active material, and thus internal resistance increase, which causes low electrical conductivity of LiFePO$_4$, may be resolved, and superior high-temperature stability and output characteristics may be exhibited.

The lithium-containing phosphate may be composed of first particles and/or second particles in which first particles are physically aggregated.

An average particle diameter of the first particles may be 1 nanometer to 300 nanometers and an average particle diameter of the second particles may be 1 to 40 micrometers. Particularly, an average particle diameter of the first particles may be 10 nanometers to 100 nanometers and an average particle diameter of the second particles may be 2 and 30 micrometers. More particularly, an average particle diameter of the second particles may be 3 to 15 micrometers.

When an average particle diameter of the first particles is excessively large, desired improvement of ionic conductivity may not be exhibited. On the other hand when an average particle diameter of the first particles is excessively small, it is not easy to manufacture a battery. In addition, when an average particle diameter of the second particles is excessively large, bulk density is reduced. On the other hand when an average particle diameter of the second particles is excessively small, a process may not be effectively performed.

A specific surface area (BET) of the second particles may be 3 m$^2$/g to 40 m$^2$/g.

The lithium metal phosphate may be coated with a conductive material to increase electrical conductivity and the conductive material may be at least one selected from conductive carbon, precious metal, metal, and conductive polymers. In particular, it is desirable to coat the lithium metal phosphate with conductive carbon since conductivity may be effectively improved without dramatic increase in preparation costs and weights.

The amount of the conductive carbon may be 0.1 wt % to 10 wt %, particularly 1 wt % to 5 wt %, based on a total weight of the cathode active material. When the amount of the conductive carbon is excessively large, the amount of the lithium metal phosphate is relatively reduced, thereby deteriorating total characteristics of a battery. On the other hand excessively small amount of the conductive carbon is undesirable since it is difficult to improve electrical conductivity.

The conductive carbon may be coated over a surface of each of the first particles and the second particles. For example, the conductive carbon may be coated to a thickness of 0.1 to 100 nanometers over surfaces of the first particles and to a thickness of 1 to 300 nanometers over surfaces of the second particles. When the first particles are coated with 0.5 to 1.5 wt % of the conductive carbon based on a total weight of the cathode active material, a thickness of the carbon coating layer may be approximately 0.1 to 2.0 nanometers.

In the present invention, the amorphous carbon is a carbon-based compound except for crystalline graphite and for example, may be hard carbon and/or soft carbon. The amorphous carbon may be prepared through a process including thermal-treatment at 1800° C. or less. For example, the hard carbon may be prepared through thermal decomposition of a phenolic resin or a furan resin and the soft carbon may be prepared through carbonization of coke, needle coke, or pitch.

An X-ray diffraction (XRD) spectrum of an anode, in which the amorphous carbon was used, is illustrated in FIG. 1.

The hard carbon and the soft carbon, for example, may be mixed in a weight ratio of 5:95 to 95:5 based on a total weight of the anode active material.

An average particle diameter of the amorphous carbon, for example, may be 0.01 micrometers to 30 micrometers and a specific surface area with respect to a capacity thereof may be 0.001 $m^2$/mAh to 0.055 $m^2$/mAh.

The average particle diameter and the specific surface area with respect to capacity of the amorphous carbon are an optimal range to exhibit effects in accordance with the present invention. Accordingly, average particle diameters and specific surface areas with respect to capacity, which are greater or smaller than the range, are not desirable.

Hereinafter, a composition of the lithium secondary battery according to the present invention will be described.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 micrometers to 500 micrometers. The cathode current collector is not particularly limited so long as it does not cause chemical changes in the fabricated secondary battery and has high conductivity. For example, the cathode current collector may be made of stainless steel, aluminum, nickel, titanium, sintered carbon, aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 wt % to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder, conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 wt % to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

An anode current collector is typically fabricated to a thickness of 3 micrometers to 500 micrometers. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte.

The separator is disposed between the cathode and the anode and an insulating thin film having high ion permeability and mechanical strength is used as the separator. The separator typically has a pore diameter of 0.01 micrometers to 10 micrometers and a thickness of 5 micrometers to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, and the like may be used, but the present invention is not limited thereto.

The non-aqueous organic solvent may be at least one solvent selected from the group consisting of carbonate-based solvents, ester-based solvents, ether-based solvents, and ketone-based solvents. In particular, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides. Concentration of the lithium salt in an electrolyte may be 0.5 to 3 M.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The battery pack including one or more lithium secondary batteries described above may be used as a power source for devices that require stability at high temperature, long cycle life, and high rate characteristics.

Examples of the devices include electric vehicles, hybrid electric vehicles (HEVs), plug-in hybrid electric vehicles (PHEVs), and the like, and the secondary battery according to the present invention may be desirably used in hybrid electric vehicles due to superior output characteristics thereof.

Recently, research into use of a lithium secondary battery in power storage devices, in which unused power is converted into physical or chemical energy for storage and when necessary, the converted energy is used as electric energy, is being actively performed.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph illustrating an X-ray diffraction (XRD) spectrum of an anode, to which amorphous carbon according to the present invention is applied;

FIG. 2 is a graph illustrating output characteristics of Experimental Example 1 according to the present invention;

FIG. 3 is a graph illustrating output characteristics of Experimental Example 2 according to the present invention; and FIG. 4 is a graph illustrating output characteristics of Experimental Example 3 according to the present invention

MODE FOR INVENTION

Now, the present invention will be described in more detail with reference to the following examples. These examples are provided only for illustration of the present invention and should not be construed as limiting the scope and spirit of the present invention.

Example 1

86 wt % of $LiFePO_4$ as a cathode active material, 8 wt % Super-P as a conductive material, and 6 wt % PVdF as a binder were added to NMP to prepare a cathode mixture slurry. The resulting cathode mixture slurry was coated, dried, and pressed over one side of aluminum foil to prepare a cathode.

93.5 wt % of the soft carbon as an anode active material, 2 wt % Super-P as a conductive material, 3 wt % SBR as a binder, and 1.5 wt % CMC as a thickener were added to $H_2O$ as a solvent to prepare an anode mixture slurry. The resulting anode mixture slurry was coated, dried, and pressed over one side of copper foil to prepare an anode.

The cathode and the anode were laminated using Celgard™ as a separator to prepare an electrode assembly. Subsequently, a lithium non-aqueous electrolyte including 1 M $LiPF_6$ was added to a mixed solvent composed of 80 wt % of dibutyl ether and 20 wt % of propylene carbonate (PC), to prepare a lithium secondary battery.

Example 2

A lithium secondary battery was manufactured in the same manner as in Example 1, except that a mixed solvent composed of 80 wt % of ethylene glycol dimethyl ether and 20 wt % of propylene carbonate (PC) was used instead of the mixed solvent composed of 80 wt % of dibutyl ether solvent and 20 wt % of propylene carbonate (PC).

Comparative Example 1

A lithium secondary battery was manufactured in the same manner as in Example 1, except that carbonate (EC:EMC:DMC=20:40:40) was used instead of the mixed solvent composed of 80 wt % of dibutyl ether and 20 wt % of propylene carbonate (PC).

Comparative Example 2

A lithium secondary battery was manufactured in the same manner as in Example 2, except that 93.5 wt % of the graphite as an anode active material was used instead of 93.5 wt % of the soft carbon.

Experimental Example 1

Relative resistances of the batteries prepared according to Example 1 and Comparative Example 1 were measured under a condition of 3 cycles× (CC discharge→rest for 20 min→CC/CV charge)→rest for 30 min→9 cycles× (CC discharge at 10% SOC→rest for 1 hr→10 C discharge for 10 s→rest for 30 min→10 C charge for 10 s→rest for 30 min). Subsequently, relative outputs according to an output formula below were measured under SOC50%. Results are illustrated in FIG. 2 below.

$$\text{Output calculation formula} = OCV\text{SOC}50\% \times (OCV\text{-SOC}50\%-V\text{min})/R\text{SOC}50\%$$

As shown in FIG. 2, it can be confirmed that the output of the battery according to Example 1 relatively increases, when compared with the battery according to Comparative Example 1.

Experimental Example 2

The lithium secondary batteries prepared according to Example 1 and Comparative Example 1 were discharged to a state of SOC50% and then stored in a −30° C. chamber for 5 hours. Subsequently, relative outputs were measured under a condition of IC discharge. Results are illustrated in FIG. 3 below.

As shown in FIG. 3, it can be confirmed that the output at low temperature of Example 1 relatively increases, when compared with Comparative Example 1.

Experimental Example 3

Relative outputs of the lithium secondary batteries prepared according to Example 1, Example 2 and Comparative Examples 1 and 2 were measured under a condition of (CC/CV discharge→rest 20 min→0.1 C CC discharge). Results are illustrated in FIG. 4 below and also represented in Table 1 below.

TABLE 1

|  | Example 1 | Example 2 |
| --- | --- | --- |
| Charging Capacity | 100 | 100 |
| Discharging Capacity | 76 | 80 |

As shown in FIG. 4, it can be confirmed that the capacity of the battery according to Example 2 relatively remains high, when compared with the battery according to Comparative Example 1 and 2.

As shown in Table 1, it can be confirmed that the discharging capacity of the battery according to Example 2 relatively remains high, when compared with the battery according to Example 1. Moreover, since the electrolyte and the anode keep reacting as cycles of charging and discharging are repeated, the difference of capacity will be more significant.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a secondary battery according to the present invention includes predetermined lithium metal phosphate, amorphous carbon, and an electrolyte including an ether based solvent and propylene carbonate, thereby exhibiting high-temperature lifespan characteristics and superior room- and low-temperature output characteristics. Therefore, the secondary battery may be suitably used in hybrid electric vehicles.

The invention claimed is:

1. A lithium secondary battery comprising:
a cathode active material comprising a lithium metal phosphate according to Formula 1 below;
an anode active material consisting of amorphous carbon having an average particle diameter of 0.01 µm to 30 µm and a specific surface area with respect to a capacity thereof of 0.015 m²/mAh to 0.055 m²/mAh; and
an electrolyte for lithium secondary batteries comprising a lithium salt, propylene carbonate (PC) and ethylene glycol dimethyl ether,
wherein propylene carbonate (PC) is comprised in an amount of 1 wt % to 60 wt % in the electrolyte for lithium secondary batteries, based on a total weight of the electrolyte, $$Li_{1+a}M(PO_{4-b})X_b \qquad (1)$$

wherein M is at least one selected from metals of Groups II to XII; X is at least one selected from F, S and Ni, −0.5≤a≤+0.5, and 0≤b≤0.1.

2. The lithium secondary battery according to claim 1, wherein the propylene carbonate (PC) is comprised in an amount of 1 to 40 wt % based on a total weight of the electrolyte.

3. The lithium secondary battery according to claim 1, wherein the lithium salt is at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides, and has a concentration of 0.5 to 3 M in the electrolyte.

4. The lithium secondary battery according to claim 1, wherein the lithium metal phosphate is a lithium iron phosphate having an olivine crystal structure according to Formula 2 below:

$$Li_{1+a}Fe_{1-x}M'_x(PO_{4-b})X_b \qquad (2)$$

wherein M' is at least one selected from Al, Mg, Ni, Co, Mn, Ti, Ga, Cu, V, Nb, Zr, Ce, In, Zn, and Y,
X is at least one selected from F, S, and N, and
−0.5≤a≤+0.5, 0≤x≤0.5, and 0≤b≤0.1.

5. The lithium secondary battery according to claim 4, wherein the lithium iron phosphate having the olivine crystal structure is LiFePO$_4$.

6. The lithium secondary battery according to claim 5, wherein the lithium iron phosphate having the olivine crystal structure is coated with conductive carbon.

7. The lithium secondary battery according to claim 1, wherein the amorphous carbon is hard carbon and/or soft carbon.

8. A battery module comprising the lithium secondary battery according to claim 1 as a unit cell.

9. A battery pack comprising the battery module according to claim 8.

10. A device comprising the battery pack according to claim 9.

11. The device according to claim 10, wherein the device is a hybrid electric vehicle, a plug-in hybrid electric vehicle, or a system for storing power.

\* \* \* \* \*